UNITED STATES PATENT OFFICE.

ERNST HEINRICH CARL DURKOPF, OF DARMSTADT, GERMANY, ASSIGNOR TO THE FIRM OF E. MERCK, OF SAME PLACE.

FORMALDEHYDE PROTEIDS CONTAINING IODIN.

SPECIFICATION forming part of Letters Patent No. 601,072, dated March 22, 1898.

Application filed May 26, 1897. Serial No. 638,228. (No specimens.)

*To all whom it may concern:*

Be it known that I, ERNST HEINRICH CARL DURKOPF, a subject of the Emperor of Germany, residing at Darmstadt, in the Province of Starkenburg, Grand Duchy of Hesse, in the German Empire, have invented a new and useful Chemical Compound and Group of Compounds and Process for Producing the Same, of which the following is a full, clear, and exact specification.

I have discovered that the product resulting from the condensation of formaldehyde with a proteid by the action of a condensing agent and possessing the characteristics set forth in my application (Case A) for United States Letters Patent executed on the 4th day of May, 1897, and filed on the 26th day of May, 1897, and serially numbered 638,227 is capable of absorbing iodin directly from solutions containing iodin—such as, for instance, a solution of iodin in potassium-iodid solution—and that a new compound containing iodin in addition to the above condensation product and appearing as a reddish-yellow powder when dried can thereby be produced. I have also discovered that the same iodin-containing compound is obtainable by adding a suitable iodin solution during the process of producing the condensation product described in my above-mentioned former application instead of adding it after the completion of the said product, so that instead of the simple condensation product described in my former referred-to application a compound of it with iodin will result, which compound is identical with the iodin-containing compound produced as above described. This compound is particularly useful for the antiseptic and disinfectant treatment of wounds, adding, as it does, the antiseptic effect of the iodin to that of the formaldehyde described in my former application.

In order to definitely characterize my new compound, it should be stated that when 0.01 gram of it is treated with one cubic centimeter of concentrated sulfuric acid the reddish-yellow color of the powder at first gives way to a dirty brownish-blue and upon warming solution occurs, the color becoming dark claret-red to brown. If this solution is diluted by pouring it into alcohol or water, the lighter shade of its color, as corresponding to the dilution, is at first constant; but upon actively boiling the liquid becomes turbid and decomposition takes place, iodin being liberated. Concentrated hydrochloric acid colors the compound brownish without causing it to enter into solution. Concentrated nitric acid colors the compound at first to dirty brown and upon warming dissolves it with a yellow to reddish color. This solution yields, with a large volume of water, a yellowish-white precipitate resembling a precipitation of sulfur. This precipitate dissolves in solutions of alkalies, carbonates of the alkalies, and ammonia with a yellow color. The iodin in my compound may be abstracted therefrom by solutions of alkalies or of carbonates of the alkalies.

*Examples.*

1. One kilogram of the condensation product prepared from formaldehyde and a proteid—as, for instance, casein—under the influence of a condensing agent—as, for instance, hydrochloric acid—is suspended in ten kilograms of water, and a solution of one hundred grams of potassium iodid and one hundred grams of iodin in a sufficient quantity of water is added with agitation. A portion of the iodin is thus taken up by the said condensation product, which thereby assumes a yellow color, and the compound thus formed, after washing with water and drying, forms a reddish-yellow powder, which is my new product described in the present application.

2. One kilogram of casein is dissolved in ten kilograms of 0.6 per cent. soda-lye. Hereto one kilogram of a forty-per-cent. formaldehyde solution and a solution of one hundred grams potassium iodid and one hundred grams iodin in sufficient water are added. Condensation is then effected by suitable means, preferably by the addition of hydrochloric acid, as described in my above-named former application. The condensation product thus formed, now containing iodin, is a yellow precipitate, which, being washed with water and dried, forms a reddish-yellow powder identical in all respects with the final product described under the first example above.

3. In place of the alkaline solution of casein before described milk may be used, and after the addition thereto of formaldehyde solution and iodin solution, as herein described, the mixture thus obtained is subjected to the further treatment with a condensing agent—such as, for instance, hydrochloric acid—and the final product after being washed and dried will again be the same as in the above examples 1 and 2.

Generally speaking, the condensation product of any proteid with formaldehyde may be treated as described in the above example 1 and will yield an iodin-containing compound, as hereinbefore explained; also, the iodin solution here described may be introduced in the midst of the process of preparing the condensation product of formaldehyde with a proteid at any time before the condensation stage, as shown in the above examples 2 and 3, and the final result will again be an iodin-containing formaldehyde-proteid condensation product.

Having thus described my invention, what I claim and desire to secure by Letters Patent, is—

1. A new chemical compound, being derived from proteids, such as casein, condensed with formaldehyde and containing iodin; said compounds appearing naturally in the shape of reddish-yellowish powders; and when treated with concentrated hydrochloric acid turning to a brownish color without entering into solution; and when treated with concentrated nitric acid turning first to a dirty brown, and upon then being warmed dissolving with a yellow to reddish color; which solution yields, with a large volume of water, a yellowish-white precipitate resembling a precipitation of sulfur, which is soluble in solutions of alkalies, of carbonates of the alkalies, and of ammonia, with a yellow color; and which compounds, on 0.01 gram thereof being treated with one cubic centimeter of concentrated sulfuric acid, the natural reddish-yellowish color of the powder at first gives way to a dirty brownish blue, and upon warming, solution occurs, coloring from claret-red to brown, on said solution being diluted by pouring into alcohol or water the lighter shade of its color, as corresponding to the dilution, is at first constant, but upon actively boiling becomes turbid while decomposition takes place, iodin being liberated; and which compounds furthermore, when treated with alkaline solutions, will lose the iodin which they contained.

2. A condensation product from casein and formaldehyde, containing iodin, said compound appearing naturally in the shape of a reddish-yellowish powder; and when treated with concentrated hydrochloric acid turning to a brownish color without entering into solution; and when treated with concentrated nitric acid turning first to a dirty brown, and upon then being warmed dissolving with a yellow to reddish color; which solution yields, with a large volume of water, a yellowish-white precipitate resembling a precipitation of sulfur, which is soluble in solutions of alkalies, of carbonates of alkalies, and of ammonia, with a yellow color; and which compound, on 0.01 gram thereof being treated with one cubic centimeter of concentrated sulfuric acid the natural reddish-yellowish color of the powder at first gives way to a dirty brownish blue, and upon warming, solution occurs, coloring from claret-red to brown, on said solution being diluted by pouring into alcohol or water the lighter shade of its color, as corresponding to the dilution, is at first constant, but upon actively boiling becomes turbid, while decomposition takes place, iodin being liberated; and which compound furthermore, when treated with alkaline solutions, will lose the iodin which it contains.

3. A process for the preparation of new chemical compounds, consisting in combining a proteid, formaldehyde and iodin into an iodized condensation product, by allowing iodin or an iodin solution to act upon a formaldehyde-proteid combination, substantially as described.

ERNST HEINRICH CARL DURKOPF.

Witnesses:
L. KIRCHHEIM,
W. HAUSING.